(12) United States Patent
Gold

(10) Patent No.: US 7,760,145 B2
(45) Date of Patent: Jul. 20, 2010

(54) RAISING ANTENNA EFFICIENCY FOR A PORTABLE COMMUNICATION DEVICE

(75) Inventor: Kristina Gold, Uppsala (SE)

(73) Assignee: Sony Ericsson Mobile Communications AB, Lund (SE)

(*) Notice: Subject to any disclaimer, the term of this patent is extended or adjusted under 35 U.S.C. 154(b) by 165 days.

(21) Appl. No.: 10/593,997

(22) PCT Filed: Feb. 17, 2005

(86) PCT No.: PCT/EP2005/001582

§ 371 (c)(1),
(2), (4) Date: Jun. 18, 2007

(87) PCT Pub. No.: WO2005/096438

PCT Pub. Date: Oct. 13, 2005

(65) Prior Publication Data

US 2007/0290945 A1    Dec. 20, 2007

Related U.S. Application Data

(60) Provisional application No. 60/557,593, filed on Mar. 30, 2004.

(30) Foreign Application Priority Data

Mar. 22, 2004   (EP) ................................. 04006810

(51) Int. Cl.
*H01Q 1/24* (2006.01)
(52) U.S. Cl. ................................. 343/702; 343/700 MS
(58) Field of Classification Search .................. 343/702, 343/700 MS
See application file for complete search history.

(56) References Cited

U.S. PATENT DOCUMENTS

| 6,259,418 | B1 | 7/2001 | Jones et al. .................. 343/846 |
| 6,262,364 | B1 * | 7/2001 | Yoshikawa et al. ........... 174/389 |
| 6,266,019 | B1 * | 7/2001 | Stewart et al. ............... 343/702 |
| 6,879,849 | B2 * | 4/2005 | Begic ........................ 455/575.7 |
| 2002/0187758 | A1 | 12/2002 | Ylitalo et al. ............. 455/575.1 |
| 2003/0068987 | A1 * | 4/2003 | Dufosse et al. ................ 455/90 |

FOREIGN PATENT DOCUMENTS

| EP | 1317116 | 6/2003 |
| WO | WO 02/35810 | 5/2002 |

OTHER PUBLICATIONS

International Preliminary Examination Report for PCT/EP2005/001582.
Translation of Office Action in corresponding Chinese Application No. 20058009186.6, dated Oct. 16, 2009.

* cited by examiner

*Primary Examiner*—Douglas W Owens
*Assistant Examiner*—Dieu Hien T Duong
(74) *Attorney, Agent, or Firm*—Myers Bigel Sibley & Sajovec, PA

(57) ABSTRACT

Portable communication devices are provided that include a board for receiving electrical circuits and have a ground plane and at least one throughhole. The devices also include an antenna element on one side of the board and an acoustic element placed on the board and aligned with the throughhole. The devices further include a mesh of electrically conducting material positioned between a cover of the acoustic element and the board. The mesh can be connected to the ground plane of the board to enhance the efficiency of the antenna.

12 Claims, 1 Drawing Sheet

RAISING ANTENNA EFFICIENCY FOR A PORTABLE COMMUNICATION DEVICE

RELATED APPLICATIONS

The present application is a 35 U.S.C. §371 national phase application of PCT International Application No. PCT/EP2005/001582, having an international filing date of Feb. 17, 2005 and claiming priority to European Patent Application No. 04006810.8, filed Mar. 22, 2004 and U.S. Provisional Application No. 60/557,593 filed Mar. 30, 2004, the disclosures of which are incorporated herein by reference in their entireties. The above PCT International Application was published in the English language and has International Publication No. WO 2005/096438.

TECHNICAL FIELD OF THE INVENTION

The present invention relates to the field of antennas and more particularly to a portable communication device including an in-built antenna.

DESCRIPTION OF RELATED ART

There is a trend within the field of portable communicating devices, and especially within the field of cellular phones to have the antenna in-built in the phone itself. The phones are also becoming smaller and smaller, with a need to use the space of the phone as effectively as possible. At the same time the phones have more and more functions and features and therefore also more components provided in them. Due to this fact it is hard to get antennas with a good performance. One important factor in getting good performance is the size of the ground plane, which needs to be as large as possible.

One frequently used type of antenna is the PIFA (Planar Inverted-F Antenna) antenna, where an essentially L-shaped antenna element is placed with one leg of the L at right angles to the ground plane and the other leg being essentially parallel with the ground plane. The space between the antenna element and the ground plane inside the L defines an antenna volume, which is interesting to use for placing of components and other units. It is in this regard interesting to use it in relation to acoustic elements, because these might not be that sensitive to the radiation from the antenna. A speaker can then for instance be provided in relation to a hole in the board in or close to the antenna volume.

It is furthermore interesting to provide speakers with good sound properties in the phones of today in order to use the phone as a music machine. In doing this it is often interesting to provide stereo sound, and thus use two speakers. In order to get good stereo sound the speakers might furthermore need to be large, which makes the corresponding holes in the board even larger.

When big holes are made in the board under the antenna element, there will naturally be holes also in the ground plane, which is thus not solid any more. This is a serious drawback for the efficiency of the antenna, which then has a worse performance, than an antenna with a solid ground plane.

There is thus a need for providing a solution to the worsened performance because of holes provided in the ground plane close to the antenna volume of an antenna.

EP-1317116 describes a cellular phone having a board with a ground plane above which is placed a PIFA antenna for defining an antenna volume. The antenna volume is used for the placing of a loudspeaker. The loudspeaker is in the preferred embodiment of the document placed inside the antenna volume. Radiation is here partly absorbed by the speaker, which absorption is here limited through varying the escape path impedance for the created radiation. This varying is in the preferred embodiment provided through inserting inductances between the windings of the speaker and the electrical feeding connections of the speaker, which stops the radiofrequencies received by the speaker from reaching the ground plane. In another embodiment the speaker is placed on one side of the board, with one part extending into the antenna volume through a hole of the board, while the antenna is provided on the opposite side of the board. The hole is here the element that varies the escape path. In this embodiment there is thus a hole in the ground plane, which, although it hinders absorption of radiation by the loudspeaker, would probably still provide worsened performance of the antenna because of the hole, especially if this hole was big.

SUMMARY OF THE INVENTION

The present invention is directed towards solving the problem of enhancing the performance of the in-built antenna in a portable communication device when the ground plane for the antenna has holes close to an antenna element.

One object of the present invention is thus to provide a portable communication device that enhances the performance of an included in-built antenna when the ground plane for the antenna has holes close to an antenna element.

According to a first aspect of the present invention, this object is achieved by a portable communication device comprising:
 a board for receiving electrical circuits and comprising a ground plane and having at least one throughhole,
 an antenna element provided on one side of the board, and
 an acoustic element placed on the board aligned with the throughhole,
 wherein an electrically conducting material related to the exterior of said acoustic element is connected to the ground plane of said board for enhancing the efficiency of the antenna.

A second aspect of the present invention is directed towards a portable communication device including the features of the first aspect, wherein the antenna element is positioned with at least one part at a distance above the board, for defining an antenna volume between the board and the antenna element, and said at least one hole is provided under the antenna element.

A third aspect of the present invention is directed towards a portable communication device including the features of the second aspect, wherein the acoustic element is provided on another opposite side of the board.

A fourth aspect of the present invention is directed towards a portable communication device including the features of the third aspect, wherein an acoustic box associated with the acoustic element is provided in the antenna volume.

A fifth aspect of the present invention is directed towards a portable communication device including the features of the first aspect, wherein the material is a cover of the acoustic element made of an electrically conducting material.

A sixth aspect of the present invention is directed towards a portable communication device including the features of the fifth aspect, wherein the cover is provided with sound apertures.

A seventh aspect of the present invention is directed towards a portable communication device including the features of the first aspect, wherein the material is a mesh made of an electrically conducting material placed between the cover of the acoustic element and the board.

An eighth aspect of the present invention is directed towards a portable communication device including the features of the first aspect, wherein the material is connected to the ground plane using electrically conducting springs.

A ninth aspect of the present invention is directed towards a portable communication device including the features of the first aspect, wherein the material is connected to the ground plane using an electrically conducting gasket.

A tenth aspect of the present invention is directed towards a portable communication device including the features of the first aspect, wherein the antenna element is a PIFA antenna element.

An eleventh aspect of the present invention is directed towards a portable communication device including the features of the first aspect, wherein it is a cellular phone.

The invention has the following advantages. It is cheap to produce. It allows dual use of the space on the board harbouring the antenna, such that an acoustic element is combined with the antenna, which saves space within the portable communication device for other units. The problem with degraded antenna efficiency is greater the bigger the holes are that are needed. This degraded antenna efficiency because of the holes is limited by the grounding made of conducting material related to the exterior of the acoustic element. It also allows the use of big speakers that have good sound properties while limiting the degradation of the antenna efficiency to a minimum.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION OF EMBODIMENTS

A portable communication device according to the present invention will now be described in relation to a cellular phone, which is a preferred variation of the invention. The phone is furthermore preferably a so-called stick type phone, but it can be other types of phones like clamshell phones. The portable communication device can also be another type of device, like a cordless phone, a communication module, a PDA or any other type of portable device communicating with radio waves.

Figure 1:
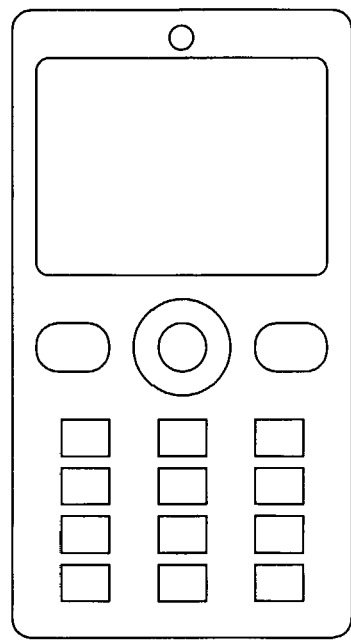
FIG. 1 schematically shows a front view of a stick type phone according to the invention.

FIG. 1 schematically shows a front view of a stick type phone according to the invention. The phone 10 includes a display and a keypad for viewing and entering information into the phone. It should be noted that the view does not show an antenna since this is inbuilt in the phone.

Figure 2:
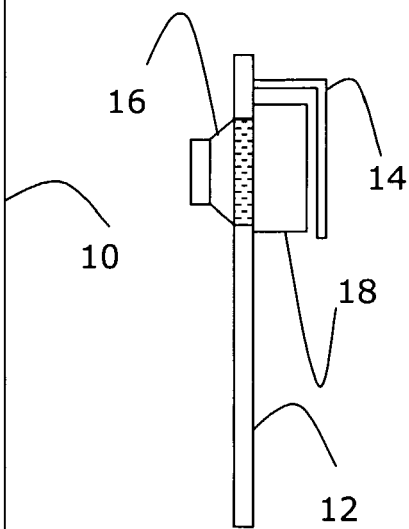
FIG. 2 shows a side view of a speaker and antenna element placed on a circuit board of the phone in FIG. 1.

FIG. 2 schematically shows a side view of a board 12 on which a number of elements relevant to the invention are shown. It should be realised that a lot more different elements in the form of components and units are in reality connected to this board, for instance a radio circuit for driving the antenna. The number of units has however been limited to a minimum in order to better explain the invention. The board 12 may either be a printed wire board or a printed circuit board. The board 12 has two sides, where an acoustic element in the form of a speaker 16 is provided on a first upper side facing a throughhole in the board, shown as a dashed area in the figure, and an antenna element 14 is provided on a second lower side opposite the first side and the speaker. The antenna element 14 is preferably a so called PIFA antenna (Planar Inverted-F Antenna), which has an L-shape, where one leg of the L is connected to the board at right angles and the other leg of the L is provided at a distance from the board essentially parallel with the board surface. The antenna element 14 is connected via electrical leads to both the ground plane and to the radio circuit provided on the board 12 for enabling transmission at suitable radio frequencies. The antenna element furthermore provides an antenna volume inside the "L", in which an acoustic box 18 is provided, into which the speaker 16 emits sound. The board 12 also includes a ground plane (not shown), which runs in a layer within the board and stretches essentially along the whole length and width of the board. The hole provided for the speaker however also goes through this ground plane. There is furthermore a second speaker and corresponding hole provided parallel to the first speaker, which is not shown in this view, this in order to provide stereo sound.

Figure 3:
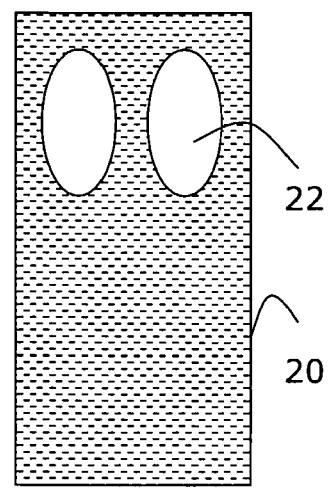
FIG. 3 shows a front view of the ground plane in the circuit board provided with holes for two speakers, FIG. 4 schematically shows a side view of a speaker being connected directly to the ground plane of the board via its metal cover, and FIG. 5 schematically shows a side view of a speaker being connected to the ground plane of the board via an additional metal mesh.

FIG. 3 shows a front view of the ground plane 20 as a dashed area with the throughholes 22 provided for the previously described speakers. The holes are dimensioned according to the speakers and are here shown as being oval in shape. It should however be realised that they can have any shape that is suitable for connecting the speaker to the acoustic box of FIG. 2, for instance having a circular shape. The shape can furthermore be dependent on the desired acoustical properties. The holes with the speaker and acoustic box together provide good acoustical properties for the speakers. However, because the sizes of the holes are so big in relation to the area of the ground plane associated with the antenna volume, they degrade the performance of the antenna significantly. The present invention is directed towards solving the problem associated with this degraded performance.

According to the invention this problem is solved through connecting electrically conducting material related to the exterior of the speaker to the ground plane. This material is preferably associated with the encapsulation of the speaker. The material is in one embodiment the casing of the speaker and in another embodiment a mesh provided between the hole and the speaker. In this way the performance is greatly enhanced.

Figure 4:
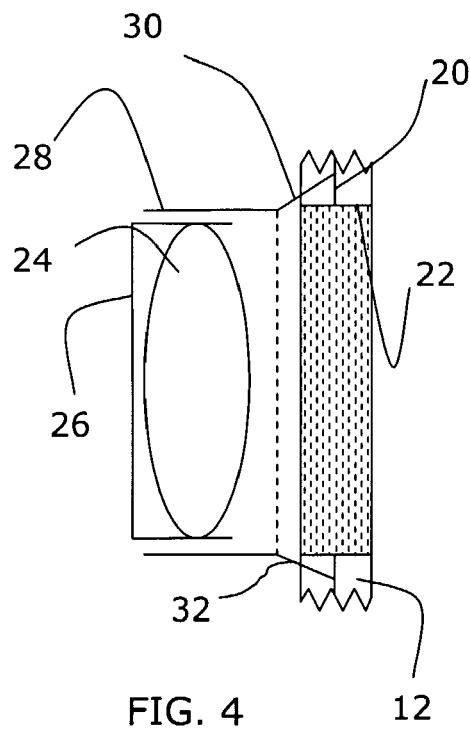

FIG. 4 shows one way of doing this according to a first embodiment of the invention. In the drawing different parts of a simplified speaker are shown in a side view in relation to the part of the board having a corresponding hole. The speaker has a sound coil 24, which is encircled at its back and sides by a plastic casing 26. On the front side of the plastic casing 26 there is provided a metallic cover 28, which also stretches down the sides of the speaker. The metallic cover 28 is provided with sound apertures on its front side, which is indicated by the cover being shown with a dashed line in this front area. The apertures are provided in order to allow the speaker to emit sound into the acoustic box provided in the antenna volume (not shown). The cover 28 and the rest of the speaker are positioned above the hole 22 in the board 12, in which board there is also shown the ground plane 20. The hole 22 is indicated in the drawing as a dashed area. In order to enhance the performance of the antenna, this metallic cover 28 is connected to the ground plane 20 via two connections 30 and 32 one on each side of the hole 22, which greatly enhances the performance of the antenna. The other hole of the board has not been described here, but it has a speaker fastened to it in the same way as for the above-described hole.

In operation of the speaker, the speaker emits sound into the acoustic box, which sound is then submitted to a user of the phone via an ear port connected to the box. The ear port is not shown in any of the drawings. This type of speaker is described in more detail in European patent application number 04003111.4, which is herein incorporated by reference.

Because of the connection of the metallic cover of the speaker to the ground plane, the ground plane is thus enlarged and the effect of the holes beneath the antenna volume are minimised. In this way unnecessary radiation that would be wasted if going through the hole is furthermore more or less eliminated.

Figure 5:
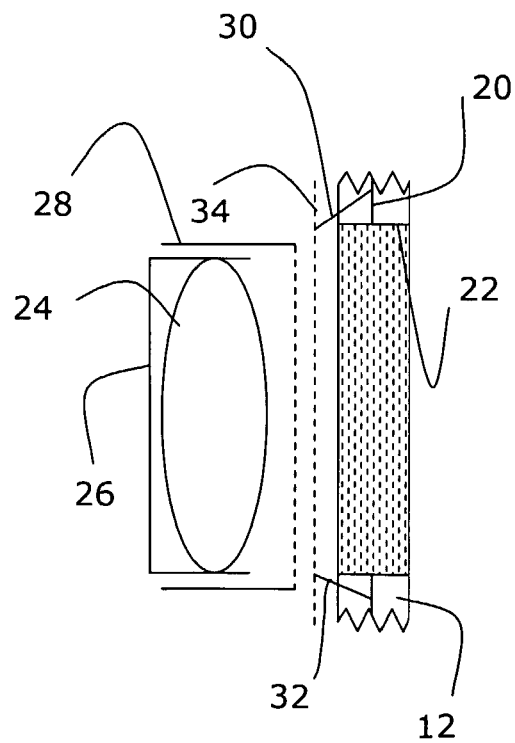

FIG. 5 shows another embodiment of the invention in the same view as FIG. 4. This figure includes all the elements of FIG. 4, but with one difference. Between the cover 28, which is plastic and not metallic, and the board 12 there is provided a metallic mesh 34, which is connected to the ground plane 20 with connections 30 and 32 in the same way as the cover in FIG. 4. The mesh 34 is indicated with a dashed line in FIG. 5. The reason for this solution is that the cover 28 is not of an electrically conductive material. In order to provide the enlargement of the ground plane, the mesh 34 is therefore inserted, which provides the necessary enlargement of the ground plane.

It should be realised that the connection of the cover or the mesh to the ground plane could be provided in a multitude of ways. They can be provided using an electrically conducting gasket surrounding the cover and/or mesh. They can be provided using metal springs that are fastened in the hole of the board. Yet another alternative is that an electrically conducting speaker holder is soldered to the board in contact with the ground plane, into which holder the speaker including cover and/or mesh is attached using for instance springs. These are just a few of the ways in which the speaker can be attached to the ground plane.

The antenna element can be a multiband antenna element designed for enabling transmission and reception at several frequency bands.

The portable communication device according to the invention has several advantages. It is cheap to produce. It allows dual use of the antenna volume, such that an acoustic element is combined with the antenna, which saves space within the portable communication device for other components and units. The problem with degraded antenna efficiency is greater the more and bigger holes that are needed. This degraded antenna efficiency because of the holes is limited by the grounding made of conducting material related to the exterior of the speaker. It also allows the use of big speakers that have good sound properties while limiting the degradation of the antenna efficiency to a minimum.

The present invention can be varied in many ways in addition to those mentioned earlier. There can be more holes, but there might just be one. The grounding can furthermore be provided in only one position, two as in FIGS. 4 and 5 or more. In the case of a gasket, the grounding can be made along the whole circumference of the hole. It is also possible to provide the speaker inside the antenna volume instead of outside. The mesh and casing that are grounded need not be metallic. It is sufficient that they are made of electrically conducting materials. Thus the present invention is only to be limited by the following claims.

The invention claimed is:

1. A portable communication device comprising:
    a board configured to receive electrical circuits, the board comprising a ground plane and at least one throughhole;
    an antenna element provided on a first side of the board;
    an acoustic element placed on the board and aligned with the throughhole; and
    a mesh comprising an electrically conducting material positioned between a cover of the acoustic element and the board,
    wherein the mesh is arranged to be substantially parallel to and adjacent the at least one throughhole and is connected to the ground plane of the board to enhance the efficiency of the antenna.

2. The portable communication device of claim 1, wherein the antenna element is positioned with at least a portion at a distance above the board, for defining an antenna volume between the board and the antenna element, and wherein the at least one hole is provided under the antenna element.

3. The portable communication device of claim 2, wherein the acoustic element is positioned on a second side of the board.

4. The portable communication device of claim 3, wherein an acoustic box associated with the acoustic element is positioned in the antenna volume.

5. The portable communication device of claim 1, wherein the mesh is connected to the ground plane using at least one electrically conducting springs.

6. The portable communication device of claim 1, wherein the mesh is connected to the ground plane using an electrically conducting gasket.

7. The portable communication device of claim 1, wherein the antenna element comprises a PIFA antenna element.

8. The portable communication device of claim 1, further comprising a cellular phone.

9. The portable communication device of claim 1, wherein the acoustic element comprises a non-conductive casing.

10. The portable communication device of claim 1, wherein the acoustic element comprises a plastic casing.

11. The portable communication device of claim 1, wherein the acoustic element cover comprises a non-conductive cover.

12. The portable communication device of claim 1, wherein the mesh is connected to the ground plane via solder.

* * * * *